Nov. 23, 1943.    L. FINKELSTEIN    2,335,049
DISPENSING DEVICE FOR PASTE, CREAM, ETC
Filed Aug. 29, 1942

INVENTOR.
Louis Finkelstein
BY
ATTORNEY

Patented Nov. 23, 1943

2,335,049

UNITED STATES PATENT OFFICE 2,335,049

DISPENSING DEVICE FOR PASTE, CREAM, ETC.

Louis Finkelstein, Brooklyn, N. Y.

Application August 29, 1942, Serial No. 456,621

4 Claims. (Cl. 221—79)

This invention relates to new and useful improvements in a dispensing device for pastes and fluids, such as tooth paste, shaving cream, and the like.

More particularly, the invention contemplates characterizing the new dispensing device by a jar for the paste and fluids which is provided with internal threads extending from the bottom to the top thereof, and a piston disposed within the jar and having peripheral threads threadedly engaging internal threads. A novel means is proposed by which the piston may be turned to cause it to travel within the jar and dispense the paste or fluid.

Furthermore, the invention contemplates providing the piston with a non-circular central opening which is engaged by a manually rotative non-circular rod which is a slidable fit therein so that the rod may be turned for indirectly turning the piston to cause it to dispense, as already mentioned.

Still further the invention contemplates a modification of the preferred form in which a tubular internally threaded liner is disposed within the jar to provide the internal threads for the piston as previously explained. A novel arrangement is proposed for holding the liner releasibly in position.

It is a still further object of this invention to provide a means including a manually depressible handle for controlling the turning of the non-circular rod in a manner to raise the piston and discharge the contents of the jar through the discharge opening.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Figure 1:
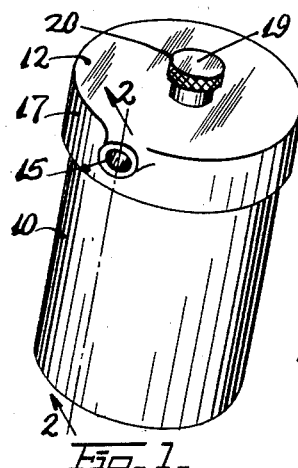
Fig. 1 is a perspective view of a dispensing device for pastes and fluids constructed in accordance with this invention.
Figure 2:
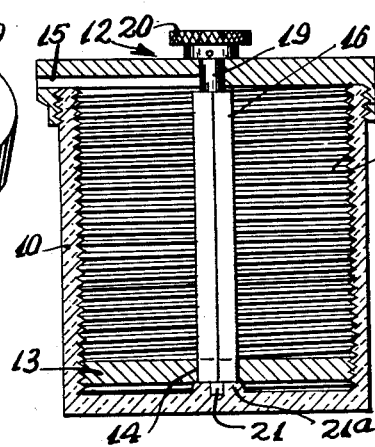
Fig. 2 is an enlarged sectional view taken on the line 2—2 of Fig. 1.
Figure 3:
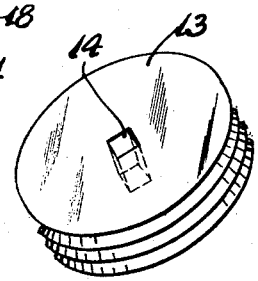
Fig. 3 is a perspective view of the piston, per se.

The dispensing device for pastes and fluids, according to this invention, includes a jar 10 for the paste or fluid and provided with internal threads 11 extending from the bottom to the top thereof. A cover 12 is provided for the jar. A piston 13 is disposed within the jar and has peripheral threads threadedly engaging said internal threads 11. This piston 13 is also provided with a non-circular central opening 14. The dispensing device has a discharge 15 for the paste or fluids, located to one side of the piston 13. A manually rotative non-circular rod 16 extends through and is a slidable fit in said non-circular central opening 14 of said piston.

The cover 12 has a skirt wall 17 which is internally threaded and which threadedly engages external threads 18 formed on the top of the jar 10. The discharge 15 is formed within the cover 12 and essentially comprises a passage from the interior of the cover to the exterior. The rod 16 has a cylindrical neck portion 19 which rotatively passes through the center of the cover 12. A knob 20 is fixed upon the outer end of said portion 19. The bottom end of the rod 16 is provided with a reduced cylindrical portion 21 which engages a complementary bearing 21a in the bottom of the jar. The arrangement is such that the knob 20 may be manually turned for turning the rod 16 which indirectly rotates the piston to move upwards or downwards in the jar 10, depending upon the direction in which the knob 20 is being turned.

The operation of the device is as follows:

The knob 20 is turned to move the piston 13 to a position in the bottom of the jar 10. Then the cover 12 and the rod 16 carried by the cover are removed. The jar is filled with the paste or fluid. The cover 12 and the rod 16 are replaced and the dispensing device is ready to be used.

Figure 4:
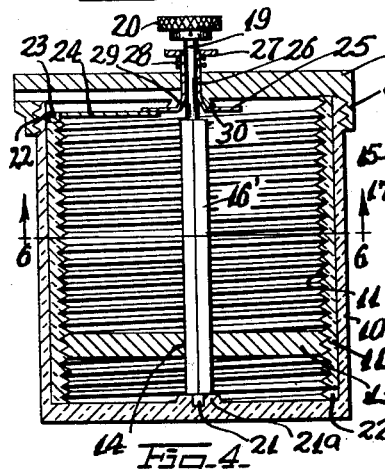
Fig. 4 is a vertical sectional view similar to Fig. 2 but illustrating a modified construction.
Figure 5:
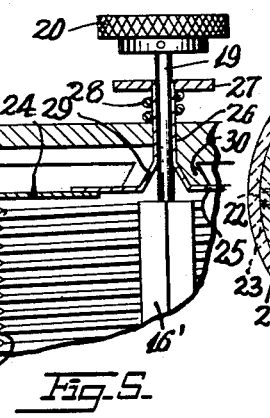
Fig. 5 is a fragmentary enlarged detailed view of a portion of Fig. 4.
Figure 6:
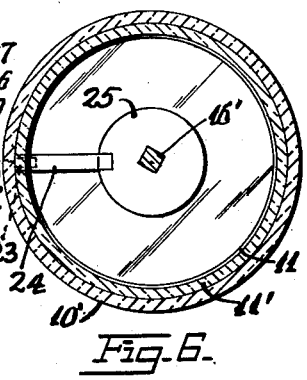
Fig. 6 is a horizontal sectional view taken on the line 6—6 of Fig. 4.

In Figs. 4–6, a modified form of the invention has been disclosed which distinguishes from the prior form in several respects. In the first place, the jar 10' is provided with internal threads by reason of being provided with a removable tubular liner 11' which has the internal threads 11. The liner 11' is of hollow cylindrical shape. At one point along its top, and at a point upon its bottom, it is provided with notches 22. One of these notches is used to hold the liner 11' from turning.

The liner 11' is held from turning by reason of the fact that a key 23 engages the top notch 22. This key 23 is mounted on a leaf spring 24 which is supported by a disc 25. The disc 25 has a central tubular portion 26 which extends through the center of the cover 12. A small knob 27 is removably mounted on the top of the tubular member 26. An expansion spring 28 is coaxially mounted on the tubular member 26 and acts between the cover 12 and the knob 27 for urging the disc 25 upwards. The tubular member 26 has a conical shaped portion 29, at its bottom end, which is cooperative with a complementary conical shaped portions 30 on the bottom of the cover 12. These conical shaped portions are in the nature of a friction clutch, or brake.

The non-circular rod 16' is provided with a reduced cylindrical top end 19 which passes through the tubular member 26. The knob 20 is mounted on the said top end 19. In other respects this form of the invention is identical to the previous form and like parts are indicated by like reference numerals.

The operation of this form of the invention is as follows:

The knob 20 may be turned to rotate the rod 16' which rotates the piston 13, driving it upwards and dispensing the fluid or paste from the jar 10'. When the piston 13 reaches its top position the cover 12 is unscrewed and removed. The cylindrical liner 11' which now has the piston 13 at the top, is then slipped out from the jar 10' and turned upside down and replaced in the jar. The piston 13 is now in the bottom of the jar. The jar is filled with paste or fluid and then the cover 12' is replaced. If the key 23, at this moment is not located within the notch 22, it is merely necessary to rotate the small knob 27 until the key 23 finds the notch 22. It then will snap into the notch because the leaf 24 is flexible. It is necessary that the knob 27 be slightly depressed, to compress the spring 28, and to disengage the friction clutch 29, 30 before it is possible to rotate the disc 25 which carries the leaf spring 24 and key 23. When the knob 27 is released, the spring 28 will raise the tubular member 26. The tubular member 26 is now held against rotation by the friction clutch 29, 30, hence the tubular lining 11' is also held from rotating. The device is now ready to dispense.

Figure 7:
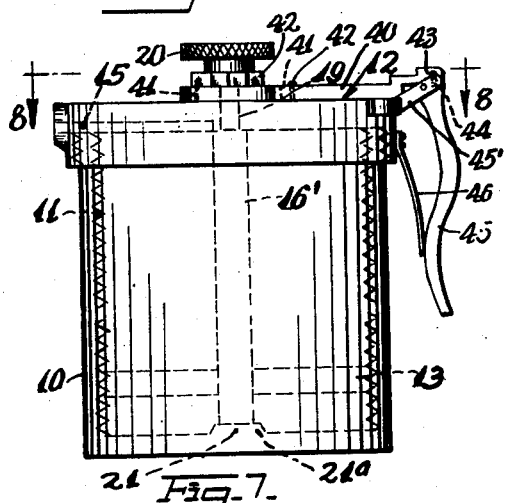
Fig. 7 is a side elevational view of a dispensing device for pastes and fluids constructed in accordance with another form of this invention.
Figure 8:
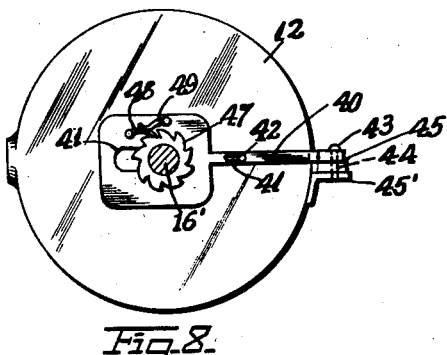
Fig. 8 is a sectional view taken on the line 8—8 of Fig. 7.

In the modified form of the invention illustrated in Figs. 7 and 8, the dispensing device is very similar to the first form of the invention, distinguishing merely in the means by which the piston is actuated. In this form of the invention, the top face of the cover 12 carries a slide 40. The slide 40 is limited to move laterally of the cover 12 by reason of its being formed with spaced elongated slots 41. The top end of the non-circular rod 16' passes through one of the slots 41 and a pin 42 passes through the other slot 41 and engages the cover 12 fixedly.

The outer end of the slide 40 is formed with a pin 43 which engages a vertical slot 44 formed in the top end of a handle 45. The handle 45 is pivotally mounted upon a bracket 45' mounted upon the side of the cover 12. A leaf spring 46 is fixedly mounted upon the cover 12 and bears against the free end of the handle 45 pivoting it outwards to urge the slide 40 inwards.

Mounted upon the top end of the non-circular rod 16' immediately below the knob 20 and engaging the top face of the slide 40 is a ratchet wheel 47. The ratchet wheel 47 is fixedly secured to the rod 16' and is engaged by a pivotally mounted pawl 48 mounted on the top face of the slide 40. A spring 49 urges the pawl 48 to continually engage the teeth of the ratchet wheel 47.

The operation of this form of the invention is as follows:

To raise the piston 13 to force more of the contents of the jar 10 through the discharge opening 15, the handle 45 is manually pivoted inwards against the action of the leaf spring 46. This will pull outwards on the slide 40. The pawl 48 will then retain its engaged position with its respective tooth of the ratchet wheel 47 and turn the ratchet wheel to correspondingly turn the non-circular rod 16'. This will turn and raise the piston 13 due to its engagement with the threads 11. On the return movement of the slide 40 when the handle 45 is released the pawl 48 will merely idle over the teeth of the ratchet wheel 47 and will not turn the non-circular rod 16'.

In other respects this form of the invention is similar to the first form and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A dispensing device for pastes and fluids having a jar with an open top and a cover for closing said open top, said cover being formed with a central opening and a side discharge opening, a tubular liner within said jar in intimate contact with the walls of said jar and formed with internal threads, a piston located within the bottom of said liner and formed with peripheral threads engaging the threads of said liner, a non-circular rod rotatively extended concentrically through said jar and having its top end projected through the central opening of said cover to be manually turned, said piston being formed with a non-circular central opening through which said rod slidably extends to rotate with said rod to be advanced upwards on said rod by said interengaged threads as said rod is turned for discharging the contents of the jar through the discharge opening in said cover, and means for holding said tubular liner against turning when said piston turns to insure advancement of said piston on said rod when said rod is turned, comprising a tubular member concentrically rotatively mounted on the top end of said rod and rotatively extended through the central opening of said cover to be manually turned, a leaf spring extending radially from the inner end of said tubular member, a key mounted on the outer end of said leaf spring and engageable with a complementary cutout formed in the top edge of said liner in a certain turned position of said tubular member relative to said tubular liner.

2. A dispensing device for pastes and fluids having a jar with an open top and a cover for closing said open top, said cover being formed with a central opening and a side discharge opening, a tubular liner within said jar in intimate contact with the walls of said jar and formed with internal threads, a piston located within the bottom of said liner and formed with peripheral threads engaging the threads of said liner, a non-circular rod rotatively extended concentrically through said jar and having its top end projected through the central opening of said cover to be manually turned, said piston being formed with a non-circular central opening through which said rod slidably extends to rotate with said rod to be advanced upwards on said rod by said interengaged threads as said rod is turned for discharging the contents of the jar through the discharge opening in said cover, and means for holding said tubular liner against turning when said piston turns to insure advancement of said piston on said rod when said rod is turned, comprising a tubular member concentrically rotatively mounted on the top end of said rod and rotatively extended through the central opening of said cover to be manually turned, a leaf spring extending radially from the inner end of said tubular member, a key mounted on the outer end of said leaf spring and engageable with a complementary cutout formed in the top edge of said liner in a certain turned position of said tubular member relative to said tubular liner, and means for releasably holding said tubular member against turning 3. A dispensing device for pastes and fluids having a jar with an open top and a cover for closing said open top, said cover being formed with a central opening and a side discharge opening, a tubular liner within said jar in intimate contact with the walls of said jar and formed with internal threads, a piston located within the bottom of said liner and formed with peripheral threads engaging the threads of said liner, a non-circular rod rotatively extended concentrically through said jar and having its top end projected through the central opening of said cover to be manually turned, said piston being formed with a non-circular central opening through which said rod slidably extends to rotate with said rod to be advanced upwards on said rod by said interengaged threads as said rod is turned for discharging the contents of the jar through the discharge opening in said cover, and means for holding said tubular liner against turning when said piston turns to insure advancement of said piston on said rod when said rod is turned, comprising a tubular member concentrically rotatively mounted on the top end of said rod and rotatively extended through the central opening of said cover to be manually turned, a leaf spring extending radially from the inner end of said tubular member, a key mounted on the outer end of said leaf spring and engageable with a complementary cutout formed in the top edge of said liner in a certain turned position of said tubular member relative to said tubular liner, a conical shaped clutch member formed on the inner end of said tubular member, said cover having its inner face formed with a complementary conical shaped recess into which said conical member seats for holding said tubular member against turning, and resilient means urging said tubular member into a position in which said conical member engages said conical recess.

4. A dispensing device for pastes and fluids having a jar with an open top and a cover for closing said open top, said cover being formed with a central opening and a side discharge opening, a tubular liner within said jar in intimate contact with the walls of said jar and formed with internal threads, a piston located within the bottom of said liner and formed with peripheral threads engaging the threads of said liner, a non-circular rod rotatively extended concentrically through said jar and having its top end projected through the central opening of said cover to be manually turned, said piston being formed with a non-circular central opening through which said rod slidably extends to rotate with said rod to be advanced upwards on said rod by said interengaged threads as said rod is turned for discharging the contents of the jar through the discharge opening in said cover, and means for holding said tubular liner against turning when said piston turns to insure advancement of said piston on said rod when said rod is turned, comprising a tubular member concentrically rotatively mounted on the top end of said rod and rotatively extended through the central opening of said cover to be manually turned, a leaf spring extending radially from the inner end of said tubular member, a key mounted on the outer end of said leaf spring and engageable with a complementary cutout formed in the top edge of said liner in a certain turned position of said tubular member relative to said tubular liner, and a knob formed on the outer end of said tubular member by which it may be turned.

LOUIS FINKELSTEIN.